Figure 1:
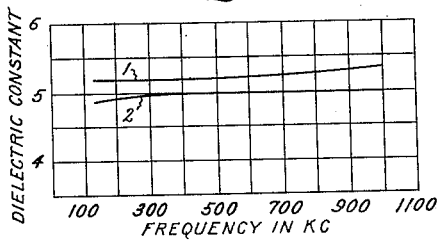

Dec. 27, 1949  F. M. CLARK  2,492,210

DIELECTRIC COMPOSITION

Filed Oct. 19, 1944

Inventor:
Frank M. Clark,
by Harry E. Dunham
His Attorney.

Patented Dec. 27, 1949

2,492,210

UNITED STATES PATENT OFFICE 2,492,210

DIELECTRIC COMPOSITION

Frank M. Clark, Pittsfield, Mass., assignor to General Electric Company, a corporation of New York Application October 19, 1944, Serial No. 559,410

4 Claims. (Cl. 252—64)

The present application is a continuation-in-part of my prior application Serial No. 493,857, filed July 8, 1943, and relates to electrical capacitors which are particularly adapted for efficient operation in the high frequency field.

One of the objects of my invention is to provide capacitors adapted for operation in power oscillator circuits for industrial heating or other uses at frequencies of ten kilocycles up to 1000 kilocycles, or higher. High frequencies most commonly in commercial use are in the range of about 500 to 1000 kilocycles.

Another object of my invention is to provide capacitors adapted for operation at high frequencies at temperatures ranging from ordinary environmental temperatures up to about 100° C., or even higher temperatures, with little or no change in capacity. Substantial constancy of capacity in high frequency circuits over the range of commonly encountered operating temperatures is particularly desirable in radio transmitter apparatus.

Mica has been commonly used as capacitor dielectric material in the high frequency field. Mica is characterized by a desirable low power factor, namely about 0.1 per cent. However, the voltage at which gas ionization leading to breakdown occurs in mica capacitors is relatively low, and impregnation of mica capacitors is difficult due to the imperviousness of mica.

I have discovered that liquid organic esters of the benzoate type, and mixtures of such esters, are well suited for dielectric function in high frequency capacitors. My present invention comprises capacitors containing liquid benzoate esters as dielectric elements.

The properties of liquid dielectric materials when subjected to high frequencies, that is, frequencies well above about 10 kilocycles, are quite unlike the properties of liquid dielectrics at ordinary low frequencies. In commercial alternating current circuits, the conventional frequencies are of the order of 25 to 60 cycles. Commonly, liquid dielectric materials which have been found in low frequency circuits to possess suitably high dielectric constant and which have operated with low dielectric losses, have been found in high frequency circuits to have impracticable electrical characteristics such as low dielectric constant, or high energy losses, or both.

In particular, esters of benzoic acid have been characterized by such high dielectric loss at low frequencies (e. g. 60 cycles) even at low impressed voltages, that they have been considered as wholly unsuited for embodiment in electric capacitors. Some of the benzoates were found to operate in capacitors, when tested on 60 cycle circuits, with power factors as high as 50 per cent, half of the input energy was lost and appeared as undesired heat. The insulation resistance of the benzoates had been found to be so low as to class the benzoates as semi-conductors, rather than promising dielectric materials which should have a very high resistivity. Mineral oil, which is widely used as a dielectric material, has a resistivity of $10^{15}$ ohms per centimeter. Oil, however, has a low dielectric constant (2 to 2.25), which consequently gives a capacitor having low microfarad capacity per unit of volume. This is undesirable in most high frequency capacitor applications. It is surprising, therefore, to find that liquid benzoate esters having much lower resistivity than mineral oil operate with high efficiency and have low energy losses when functioning as dielectric elements in high frequency capacitors.

Figure 2:
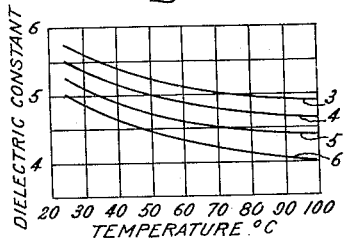
Figure 3:
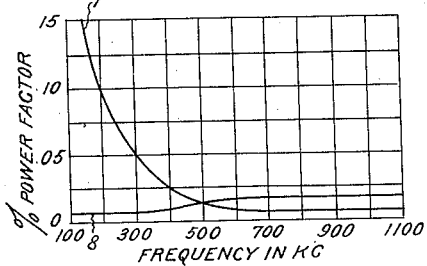
Figure 4:
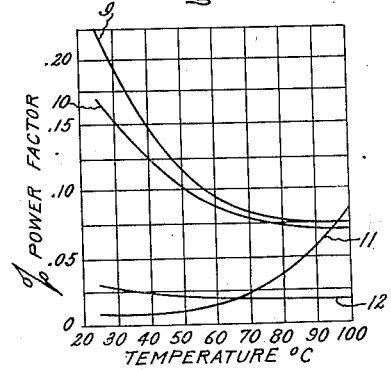
Figure 6:
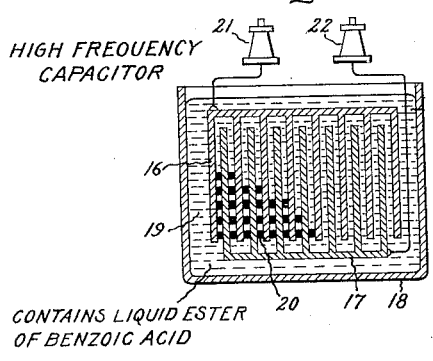
Figure 5:
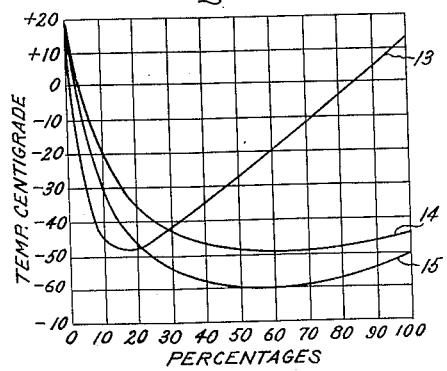

My invention will be described in greater detail in connection with the accompanying drawing. Figs. 1 and 2 of the drawing are graphs indicating the dielectric constant of benzoate esters, respectively, for a range of frequencies and a range of temperatures; Figs. 3 and 4 are graphs showing the power factor of benzoate esters over a range of temperatures and high frequencies; Fig. 5 is a graph showing the flow points of mixtures of benzoate esters, and Fig. 6 is a conventionalized vertical section of a high frequency capacitor containing liquid benzoate ester.

The following are examples of high frequency benzoate dielectric materials which are suitable for use in accordance with my invention: ethyl benzoate, butyl benzoate, isopropyl benzoate, benzyl benzoate, butyl trichlor benzoate and amyl trichlor benzoate. As will be later shown mixtures of such esters remain liquid at extremely low temperatures.

At an ambient temperature of about 25° C., all of the above-enumerated benzoates are thin mobile liquids. Their viscosity at 37.8° C. (100° F.) is within the range of 33 to 50 seconds Saybolt Universal. While their pour points differ slightly, they are all low, being in general within the range of about −45 to −50° C. Benzyl benzoate constitutes an exception. It has a pour point of about 17 to 18° C., which, however, can be used under most commonly encountered temperature conditions, the congealing point being well below room temperature. The pour point can be lowered if desired by blending it with other suitably selected benzoates.

The dielectric constant of benzoate esters is higher than the commonly observed dielectric constant of other organic esters, the dielectric constant at room temperatures of the various esters above enumerated being at least as high as about 5.

Fig. 1 shows a dielectric constant at 25° C. of benzyl benzoate, graph 1, and isopropyl benzoate, graph 2, over the high frequency range of about 100 to 1000 kilocycles. It will be observed that the dielectric constant of benzyl benzoate at 140 kilocycles is above 5, and is very nearly constant over the entire range of frequencies. A slight increase may be noted over a frequency of about 700 to 1000 kilocycles. The dielectric constant of isopropyl benzoate, graph 2, is slightly below 5 when measured with frequency of 140 kilocycles and is constant over the range of 300 to 1000 kilocycles.

As shown in Fig. 2, the dielectric constant of four benzoate esters decreases somewhat with rise of temperature. Graphs 3, 4, 5 and 6, respectively, show the characteristic of butyl trichlor benzoate, amyl trichlor benzoate, benzyl benzoate and isopropyl benzoate.

Fig. 3 shows the power factor characteristic of two benzoate esters over a range of high frequencies. Graph 7 shows the characteristic of isopropyl benzoate, and graph 8 the characteristic of benzyl benzoate.

Fig. 4 shows the power factor in per cent over a working temperature range. Graph 9, for amyl trichlor benzoate, shows the power factor to be slightly above .20% at a temperature of about 25° C., and then to drop rapidly as the temperature rises to the working range of temperatures of approximately 50° C., or higher. Graph 10 shows that butyl trichlor benzoate has a somewhat similar power factor-temperature characteristic. The power factor at about 25° C. is about .17% and decreases to about .07% when the temperature rises to about 75° C. Graph 11 shows the power factor-temperature characteristic of isopropyl benzoate. The power factor of benzyl benzoate, graph 12, is very low, approximating about .03% over the entire range of temperature of 25 to 100° C. In general the power factor of benzoate dielectric elements are well within a permissible working range over the range of operating temperatures. Benzyl benzoate, which has high dielectric constant and low power factor over a range of frequencies and over a range of temperatures, is a preferred high frequency dielectric material in capacitors.

In Fig. 5 are shown pour points (or crystallizing points) of several benzoate mixtures comprising benzyl benzoate as one component. Graph 13 shows the liquidity characteristic of mixtures of benzyl benzoate and tetrahydro furfuryl benzoate. Even small additions of latter result in a relatively great lowering of the congealing temperature. As shown by graph 13 benzoate dielectric compositions consisting of mixtures of about 80 to 90 per cent benzyl benzoate and about 20 to 10 per cent of tetrahydro furfuryl benzoate are in the liquid state at temperatures over a range of temperatures the low limit of which is about −45° C. Graph 14 shows the effect of amyl trichlor benzoate addition to benzyl bentzoate. Mixtures containing about 50 to 70 per cent of the amyl trichlor benzoate congeal at a temperature of about −50° C. Graph 15 similarly shows the congealing characteristics of a range of mixtures of benzyl benzoate and isopropyl benzoate. Mixtures containing about 50 to 60 per cent of the latter remain liquid down to −60° C.

The liquid high frequency dielectric materials of the benzoate ester type may be employed in conventional capacitors heretofore used for the high frequency field. As indicated in Fig. 6 such capacitors may comprise spaced armatures 16, 17 contained in a tank 18. The space between the armatures, as indicated in Fig. 6, may be wholly filled with a liquid benzoate ester dielectric material 19. In some cases, suitable spacers, as indicated at 20, consisting of inert material, may partly fill the space between the armatures, the space, however, being largely unobstructed. While in some cases it is convenient to employ such spacers between the armatures, they are not essential and may be omitted. In any event the space between the armatures should be mainly unobstructed. The paper spacers commonly used in low frequency capacitors should not be used in the high frequency capacitors embodying my present invention. The illustration of the armatures 16, 17, which are shown connected to external terminals 21, 22 is diagrammatic. Suitable construction for high frequency capacitors is shown in a copending application, Serial No. 500,806, filed September 1, 1943 (now abandoned) which is assigned to the same assignee as the present application.

In a capacitor containing benzyl benzoate as the sole dielectric material and constructed as conventionally indicated, a slow rise of operating temperature occurs from initial temperature of 25° C. to a steady operating temperature of about 45° C. or 50° C. in the course of about an hour of operation. During subsequent operation, the dielectric losses which appear as heat should be dissipated at such rate that the operating temperature remains substantially constant.

What I claim as new and desire to secure by Letters Patent of the United States, is:

1. A liquid dielectric material consisting of an ingredient selected from the class consisting of tetrahydro furfuryl benzoate, 10 to 25 per cent; amyl trichlor benzoate, 50 to 80 per cent and isopropyl benzoate, 50 to 60 per cent, the remainder in each instance being benzyl benzoate, said dielectric material remaining liquid at a temperature below −45° C.

2. A liquid dielectric material consisting of a mixture of about 40 to 50 per cent of benzyl benzoate and about 60 to 50 per cent of isopropyl benzoate, said mixture remaining liquid over a range of temperature down to about −60° C.

3. A dielectric material consisting of a liquid mixture of about 75 to 90 per cent benzyl benzoate and about 25 to 10 per cent of tetrahydro furfuryl benzoate, said mixture remaining liquid over a range of temperature down to about −45° C.

4. A dielectric material consisting of a liquid mixture of about 20 to 50 per cent of benzyl benzoate and about 80 to 50 per cent of amyl trichlor benzoate, said mixture remaining liquid over a range of temperature down to about −50° C.

FRANK M. CLARK.

REFERENCES CITED

The following references are of record in the file of this patent:

UNITED STATES PATENTS

| Number | Name | Date |
|---|---|---|
| 1,614,459 | Ditcham | Jan. 18, 1927 |
| 1,769,874 | Boyer | July 1, 1930 |
| 2,236,261 | Clark | Mar. 25, 1941 |
| 2,351,280 | Morgan | June 13, 1944 |

OTHER REFERENCES

"Elektrische Dipolmomente Von Organischen Moiekulen," Zeitschrift Fur Physikali.